United States Patent Office 3,243,429
Patented Mar. 29, 1966

3,243,429
AZIRIDINYL SILOXANES
George E. Ham, Lake Jackson, Tex., assignor to The Dow Chemical Company, Midland, Mich., a corporation of Delaware
No Drawing. Filed Nov. 13, 1963, Ser. No. 323,240
5 Claims. (Cl. 260—239)

This invention relates to new compositions of matter and to methods for the preparation of such compositions. More particularly, the present invention relates to trialkoxysilanes which contain both a carboxylic acid ester group and in aziridinyl group in the molecule, and to the preparation of such compounds.

Silicon compounds which contain an aziridinyl group directly bonded to the silicon atom are known. Such compounds are disclosed, for example, by Heyna et al. in German Patent 834,990.

It has now been found that complex silicon compounds containing both a carboxylic acid ester group and an aziridinyl group in the molecule may be prepared according to the following reaction

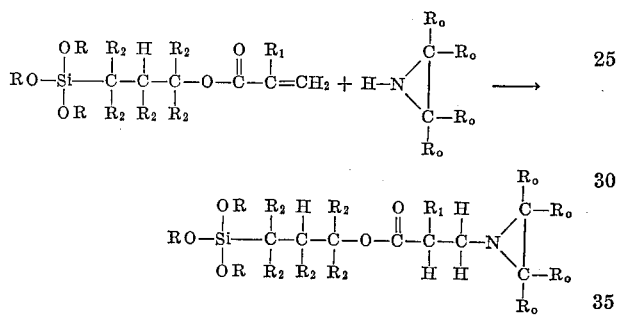

wherein each R may be the same or different and each represents an alkyl group of from 1 to 3 carbon atoms, $R_1$ and each $R_2$ is a hydrogen atom or an alkyl group of from 1 to 3 carbon atoms (i.e., the group $(C_kH_{2k})H$ where $k$ is an integer of from 0 to 3) and each $R_o$ is independently selected from the group consisting of the hydrogen atom and a lower alkyl group of from 1 to 4 carbon atoms. Thus, $R_1$, $R_2$ or R may be a methyl, ethyl, n-propyl or i-propyl group and each $R_o$ group may be any $R_1$, $R_2$ or R group, or a tert.-butyl, i-butyl, sec.-butyl or n-butyl group.

The process by which the compounds of the invention are prepared is carried out at temperatures of from about 20° to 100° C. (preferably from about 40° to 65° C.) either with or without a suitable inert solvent. For convenience, the process is usually conducted at atmospheric pressure under reflux conditions, although subatmospheric and superatmospheric pressures may be employed if desired. It is preferable to use an excess of aziridinyl compound so that the mole ratio of aziridinyl compound to silicon compound is at least 1:1. Mole ratios of aziridinyl compound to silicon compound of up to 50:1 may be used. As used herein, the term "aziridinyl" is meant to include both substituted and unsubstituted groups of the formula

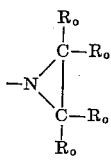

wherein each $R_o$ is selected from the group consisting of the hydrogen atom and a lower alkyl group of from 1 to 4 carbon atoms. Examples of suitable solvents which may be used include the lower alkanols such as methanol, ethanol, n-propanol, i-propanol, etc. or inert hydrocarbons such as benzene, toluene, hexane, etc.

Examples of the reaction upon which the process of the invention is based include the following:

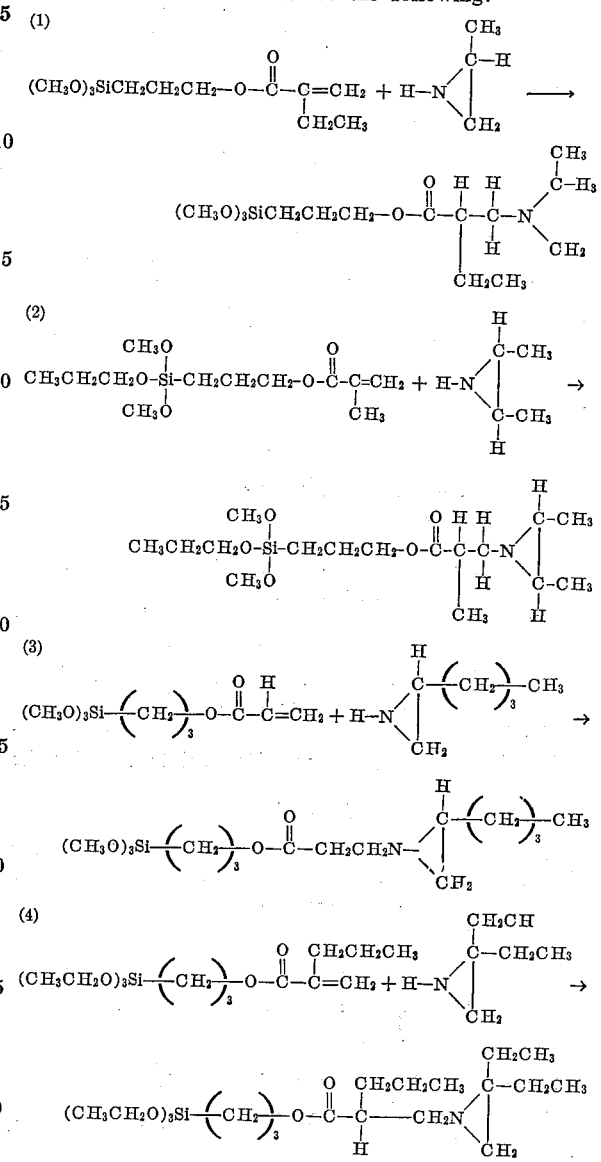

The 3-(trialkoxysilyl)propyl esters of α,β-unsaturated acids used as starting materials in the process of the invention may be obtained by the addition reaction of a trialkoxysilane and an allyl ester of an α,β-unsaturated acid. For example, 3-(trimethoxysilyl)propyl methacrylate may be prepared by reacting trimethoxysilane with allyl methacrylate in the presence of a silane addition catalyst. The reaction may be represented by the following equation:

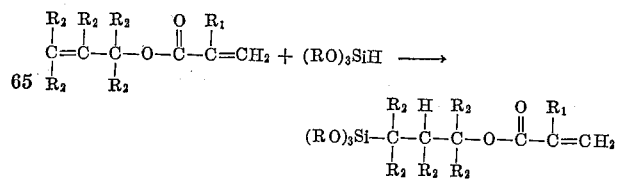

The compounds of the invention are useful for the formation of polymers which may be used to form laminates (metal, wood, plastic) and molded articles. In the presence of an acid, polymerization may be conducted through the aziridinyl group. In addition, the compounds (in either concentrated form or in dilute solutions or dispersions) are useful as bactericides and have been found to inhibit or prevent the growth of *E. coli*.

The following examples are submitted for the purpose of illustration only and are not to be construed as limiting the scope of the invention in any way.

Example I

A mixture of 20.0 grams of the compound $$CH_3O-\underset{\underset{OCH_3}{|}}{\overset{\overset{OCH_3}{|}}{Si}}-CH_2CH_2CH_2-O-\overset{\overset{O}{\|}}{C}-\overset{\overset{CH_3}{|}}{C}=CH_2$$

[3-trimethoxysilyl)propyl methacrylate] and 200 milliliters (about 170 grams) of ethylenimine was refluxed (temperature about 58° C.) for 18 hours. After this time, the excess ethylenimine was removed under vacuum, leaving 22.0 grams (a yield of 94 percent of theory) of light yellow liquid aziridinyl compound. The product had an infrared spectrum consistent with the following structure:

$$CH_3O-\underset{\underset{OCH_3}{|}}{\overset{\overset{OCH_3}{|}}{Si}}-CH_2CH_2CH_2-O-\overset{\overset{O}{\|}}{C}-\overset{\overset{CH_3}{|}}{CH}-CH_2-N\overset{CH_2}{\underset{CH_2}{\diagdown}}$$

Distillation of the product resulted in considerable decomposition and polymerization.

The purified product (2.3 grams collected prior to decomposition) had the following properties:

Boiling point _____ 100°–102° C. at 0.06 mm. of Hg.
Refractive index __ 1.4420 (20° C., Na D line).
Density _____ 1.062 at 20° C.

The infrared spectrum was identical to that for the crude product.

Example II

The following reaction mixture was heated at reflux for 1.5 hours (~58° C.) and then allowed to stand at room temperature for about 16 hours:

(a) 20.0 grams of $$CH_3O-\underset{\underset{OCH_3}{|}}{\overset{\overset{OCH_3}{|}}{Si}}-CH_2CH_2CH_2-O-\overset{\overset{O}{\|}}{C}-\overset{\overset{CH_3}{|}}{C}=CH_2$$

[3-(trimethoxysilyl)propyl methacrylate],
(b) 20.0 milliliters of methanol, and
(c) 200.0 milliliters (about 170 grams) of ethylenimine.

The excess ethylenimine and methanol were removed under vacuum, leaving 22.5 grams (a yield of 96 percent of theory) of the aziridinyl siloxane product which of the same structure as the product of Example I (identified by infrared analysis).

Example III

The product of Examples I and II were streaked onto petri dishes containing nutrient agar which had been streaked with the bacteria *E. coli*. After incubation for 48 hours at room temperature, it was noted that bacteria readily grew over the inoculated portions of the surface of each plate in every place except where the test compounds had been streaked.

I claim as my invention:

1. A compound of the formula $$RO-\underset{\underset{RO}{|}}{\overset{\overset{RO}{|}}{Si}}-\overset{\overset{R_2}{|}}{\underset{\underset{R_2}{|}}{C}}-\overset{\overset{H}{|}}{\underset{\underset{R_2}{|}}{C}}-\overset{\overset{R_2}{|}}{\underset{\underset{R_2}{|}}{C}}-O-\overset{\overset{O}{\|}}{C}-\overset{\overset{R_1}{|}}{\underset{\underset{H}{|}}{C}}-\overset{\overset{H}{|}}{\underset{\underset{H}{|}}{C}}-N\overset{\overset{R_o}{|}}{\underset{\underset{R_o}{|}}{\diagup\diagdown}}\overset{C-R_o}{\underset{C-R_o}{}}$$

wherein:
(a) each R group is an alkyl group of from 1 to 3 carbon atoms,
(b) $R_1$ is the group $(C_kH_{2k})$ H where $k$ is an integer of from 0 to 3,
(c) each $R_o$ is independently selected from the group consisting of the hydrogen atom and a lower alkyl group of from 1 to 4 carbon atoms, and
(d) each $R_2$ group is independently selected from the group consisting of the hydrogen atom and an alkyl group of from 1 to 3 carbon atoms.

2. A compound of the formula $$RO-\underset{\underset{RO}{|}}{\overset{\overset{RO}{|}}{Si}}-(CH_2)_3-O-\overset{\overset{O}{\|}}{C}-\overset{\overset{R_1}{|}}{\underset{\underset{H}{|}}{C}}-\overset{\overset{H}{|}}{\underset{\underset{H}{|}}{C}}-N\overset{\overset{R_o}{|}}{\underset{\underset{R_o}{|}}{\diagup\diagdown}}\overset{C-R_o}{\underset{C-R_o}{}}$$

wherein:
(a) each R group is an alkyl group of from 1 to 3 carbon atoms,
(b) $R_1$ is the group $(C_kH_{2k})$ H where $k$ is an integer of from 0 to 3, and
(c) each $R_o$ is independently selected from the group consisting of the hydrogen atom and a lower alkyl group of from 1 to 4 carbon atoms.

3. A compound of the formula $$CH_3O-\underset{\underset{CH_3O}{|}}{\overset{\overset{CH_3O}{|}}{Si}}-(CH_2)_3-O-\overset{\overset{O}{\|}}{C}-\overset{\overset{CH_3}{|}}{\underset{\underset{H}{|}}{C}}-CH_2-N\overset{\overset{R_o}{|}}{\underset{\underset{R_o}{|}}{\diagup\diagdown}}\overset{C-R_o}{\underset{C-R_o}{}}$$

wherein each $R_o$ is independently selected from the group consisting of the hydrogen atom and a lower alkyl group of from 1 to 4 carbon atoms.

4. A compound of the formula $$RO-\underset{\underset{RO}{|}}{\overset{\overset{RO}{|}}{Si}}-(CH_2)_3-O-\overset{\overset{O}{\|}}{C}-\overset{\overset{CH_3}{|}}{\underset{\underset{H}{|}}{C}}-CH_2-N\overset{\overset{H}{|}}{\underset{\underset{H}{|}}{\diagup\diagdown}}\overset{C-(C_mH_{2m})-H}{\underset{C-H}{}}$$

wherein each R group is an alkyl group of from 1 to 3 carbon atoms and $m$ is an integer from 0 to 4.

5. The compound:

$$CH_3O-\underset{\underset{CH_3O}{|}}{\overset{\overset{CH_3O}{|}}{Si}}-(CH_2)_3-O-\overset{\overset{O}{\|}}{C}-\overset{\overset{CH_3}{|}}{\underset{\underset{H}{|}}{C}}-CH_2-N\overset{CH_2}{\underset{CH_2}{\diagdown}}$$

References Cited by the Examiner

Houben-Weyl: Methoden der Organischen Chemie, vol. 11/2 (Stuttgart, 1958), pages 242–244.

HENRY R. JILES, *Primary Examiner.*

A. D. ROLLINS, *Assistant Examiner.*